3,515,528
BLOCK COPOLYMER STRIPPABLE COATINGS OF BUTADIENE STYRENE BLOCK COPOLYMER CONTAINING A FATTY ACID AMIDE
William B. Luther and Donald L. Martinson, Long Beach, Calif., assignors to Shell Oil Company, New York, N.Y., a corporation of Delaware
No Drawing. Filed Dec. 14, 1965, Ser. No. 513,832
Int. Cl. B24b 1/00; C08f 19/08
U.S. Cl. 51—310                                               7 Claims

ABSTRACT OF THE DISCLOSURE

Compositions especially useful for chemical milling masks comprise block copolymers with fractional percentages of fatty acid amides.

---

This invention is concerned with compositions capable of being readily stripped from surfaces bearing the same. It is also concerned with the use of such strippable coating compositions in selective erosion processes such as sand blasting. Furthermore, it is concerned with articles coated with the strippable coatings.

Numerous polymeric materials have been utilized in the past for the formation of coating compositions. One class of such compositions comprises formulations which are designed to be readily stripped from the surface on which they are laid after having performed a protective function. This may be in the complete encapsulation of articles, such as metal machine parts and the like, which are coated to protect them from corrosion, surface damage such as scratching, or oxidation, but from which it is always desirable that the coating may be readily stripped. Other situations exist which require readily strippable coatings. Generically, the classification may be regarded as being concerned with protection of selected portions of surfaces while exposed surface portions are being subjected to selective erosion. More specifically, abrasive blasting, and especially sand blasting, as generally applied to stone or other surfaces which are capable of being physically eroded. In the preparation of sand blasted stone surfaces such as in the preparation of monuments, gravestones and the like, where it is proposed to coat the stone surface with a protective coating, cut portions of the coating to expose certain portions of the stone surface such as in the form of letters and thereafter subject the stone surface to sand blasting or blasting with other abrasive materials. It is essential that the protective coating be capable of being readily stripped from the surface of the stone after sand blasting.

In many instances, it is necessary that the strippable coatings possess a special set of physical properties making them suitable for not only being stripped but for withstanding physical stresses to which they are subjected during performance of their protective function. For example, during sand blasting it is necessary to utilize as the principle component of the masking coating one which is resilient and elastic enough to repel the blast of sand or other abrasive material, while it maintains its protective function. Furthermore, in respect to the complete coating of metal articles for storage or transporation, it is highly desirable to utilize a coating which is elastic and resilient and at the same time has sufficient tensile strength that it will not be ruptured under the handling or transportation stresses that normally occur.

It is an object of the present invention to provide improved strip coating compositions. It is a special object of the invention to provide strippable coatings suitable for the enclosure of articles, and as sand blasting masks. Special objects are the provision of sand blasting processes having improved aspects. Other objects will become apparent during the following detailed description of the invention.

Now, in accordance with the present invention, strippable coating compositions are provided comprising 100 parts by weight of block copolymers having the general configuration

A–B–A wherein each A is a polymer block of a monovinyl arene and B is a polymer block of a conjugated diene, as well as hydrogenated derivatives of such block copolymers and mixtures of the same, modified by the presence of 0.05–1 part by weight of a fatty acid amide having from 16 to 24 carbon atoms per molecule. Still in accordance with this invention, articles of commerce are provided comprising an article enclosed in a coating of the above composition. Further aspects of the invention include metal or stone surfaces coated entirely or in part with the subject compositions. Still further applications of the invention include the use of the strippable coatings as masks in erosion processes such as sand blasting processes.

Fatty acid amides useful in these compositions include the following:

Erucamide
Hexadecanamide (palmitamide)
Octadecanamide (stearamide)
9-octadecenamide (oleamide)
9,12-octadecadienamide (linoleamide)
Arachidamide
Behenamide
Lignoceramide
Licanamide Mixtures of these fatty acid amides may be utilized and normally the products commercially available will constitute mixtures wherein one of the predominating components is one of the above species while other species from the above list may be present in minor amounts. Furthermore, other amides may be utilized in minor amounts such as rosin acid amides and the like, as well as polyamides of polyethylene diamines and the like wherein the amide radical thereof is derived from a high molecular weight fatty acid.

The block copolymers forming the important elastomeric component of the present composition have the general configuration

A–B–A

If the copolymer is not hydrogenated, the blocks A comprise poly(vinyl arene) blocks while the Block B is a poly(conjugated diene) block. The blocks A normally have number average molecular weights, as determined by intrinsic viscosity measurements which have been correlated with primary molecular weight measurements including osmometry and radiotracer measurements of tritium terminated polymer, of between about 8,000 and 45,000, while the conjugated diene polymer block has a number average molecular weight between about 35,000 and 150,000. If the copolymers are hydrogenated, the molecular weight ranges remain in about the same ranges. Two preferred species of such block copolymers include those having the block configuration polystyrene-polybutadiene-polystyrene and polystyrene-polyisoprene-polystyrene as well as their hydrogenated counterparts. The hydrogenated counterpart of the second of the above defined block copolymers is of especial interest, not only because of its high stability but because of the elastomeric nature of the hydrogenated mid-section which resembles that of an ethylene-propylene rubber while the end blocks either remain as polyvinyl arene blocks or, if hydrogenated, become saturated blocks made up of polyvinyl cyclohexane units. Thus, the fully hydrogenated preferred species has a block configuration which corresponds closely to polyvinyl-cyclohexane-[ethylene-propylene copolymer]-polyvinylcyclohexane.

These particular block copolymers have the unique feature of attaining the stress-strain properties of an elastomer without the requirement that it be subjected to curing or vulcanization. Thus, they are sharply differentiated from other rubbers such as natural rubber, polybutadiene, SBR and the like which require vulcanization in order to attain satisfactory stress-strain properties.

The compositions comprising the block copolymer modified by the high molecular weight fatty acid amide may be applied to the surface to be protected by any suitable means such as forming a solution or cement in a suitable solvent and thereafter applying the solution to the surface either by spraying, dipping, brushing or application with a doctor blade and the like. The use of spray coating is preferred and the selection of solvents should be such as to provide a tack-free coating under the conditions of handling or manipulating the coated article or surface. Preferably, relatively volatile solvents are utilized, such as hydrocarbons, or mixtures of hydrocarbons with low molecular weight ketones such as acetone. Furthermore, it is preferred that the solvent contain at least about 35% by weight of aromatic hydrocarbons such as benzene, toluene or xylenes. These may be modified, if desired, with aliphatic hydrocarbons such as naphtha, hexane, heptane or pentanes. An especially attractive combined solvent for use in spray coating comprises 40–60% by weight of mixed xylenes with 60–40% by weight of VM and P naphtha. The block copolymer and fatty acid amide are dissolved in this solvent by any suitable means such as stirring either with or without heat and then applying the solution to the surface to be coated either by spraying, dipping or other means. For some purposes it is not essential that antioxidants be utilized in the composition particularly if the protective film is to be performing its function only for a relatively short time but, if desired, aromatic amines or hindered phenols or the like may be utilized in order to protect the composition from oxidation or ozonolysis.

One special feature of the composition comprises the formation of coated articles which are especially protected against corrosion by the further incorporation of an amine nitrite such as dicyclohexyl amine nitrite which is slowly released in vapor form in the interior of the package to provide a corrosion protective atmosphere therein.

The thickness of coating will depend upon the desired end use and the required durability. For example, masking coatings for the purpose of protecting selected portions of stone from sand blasting normally should be relatively thick as compared with coatings used for the protection during storage of metal parts and the like.

The compositions may contain supplementary components if desired. Rubber extending oils may be utilized in like proportions for the purpose of providing lower cost compositions and may function to improve the stripability of the compositions.

Aside from the complete encapsulation of articles for their protection during storage and transportation, the next most important use of the strippable compositions comprises the protection of surfaces which are to be subjected to selective erosion, or physical abrasion. It is especially contemplated that the strippable composition be applied to the surface, a portion of the surface either being masked or cut free of the coating subsequent to application of coating thereto. Following the exposure of a desired portion of the surface, the surface is then subjected to physical abrasion, after which the protective masking composition can be readily stripped from the surface. It has been found that the subject block copolymers are especially useful for these processes in view of the set of physical properties typifying cured rubbers without actually having been cured, since the block copolymers forming a major component of the subject compositions do not require vulcanization. In the present instance, it is preferred that the entire surface be spray coated with the composition in solution and thereafter the portions which is desired to erode are cut out and stripped away, leaving the residual masking coating on the balance of the surface.

The presence of the higher fatty acid amides in the block copolymers have secondary benefits which are of material importance when the compositions are subjected to any forming operation such as molding, extrusion and the like, since it has been found that they increase the rate of extrusion and facilitate removal of the formed articles from a mold such as in compression or injection molding operations.

In order to demonstrate the improved stripping properties of the compositions of this invention, the following comparative tests were employed. The block copolymer utilized in these tests had the general structure Polystyrene-polybutadiene-polystyrene wherein the average molecular weights were 14,000–64,000–14,000. A 17% by weight solution of this copolymer was formed in a 40:60 mixture of xylenes and VM and P naphtha. Films were cast on stainless steel plates having a 12–16 micro-inch polished surface. Film adhesion was determined by an 180° peel test utilizing an Instron tested at 20 inches per minute separation speed. Comparative tests were made between films of the unmodified polymer and film specimens containing either 0.2, 0.5, or 1 phr. (parts by weight per 100 parts block copolymer) of several different high molecular weight fatty acid amides. Table 1 presents the results obtained. It will be seen that the samples containing the fatty acid amide exhibited only about ¼ of the adhesion to the steel plate as that of the unmodified block copolymer.

TABLE 1

| Additive | Concentration, phr. | Adhesion, pounds per linear inch |
| --- | --- | --- |
| None | | 0.8 |
| 9-octadecenamide | 0.2 | 0.3 |
| ____do____ | 0.5 | 0.2 |
| ____do____ | 1.0 | 0.2 |
| Erucamide | 0.5 | 0.3 |
| ____do____ | 1.0 | 0.3 |

We claim as our invention:
1. As a new composition of matter, the composition consisting essentially of:
 (a) 100 parts by weight of an unvulcanized block copolymer of the group consisting of block copolymers having the general configuration A–B–A wherein each A is a polymer block of a monovinyl arene, said block having an average molecular weight between about 8,000 and about 45,000; and B is polymer block of a conjugated diene, said block having an average molecular weight between about 35,000 and about 150,000; and
 (b) 0.05–1.0 part by weight of a fatty acid amide having from 16 to 24 carbon atoms per molecule.
2. A composition according to claim 1 wherein the block copolymer has the general configuration polystyrene-polybutadiene-polystyrene

3. A composition according to claim 2 wherein the amide is an octadecenamide.
4. A metal surface coated with a composition according to claim 1.
5. A stone surface coated with a composition according to claim 1.
6. An abrasive milling process which comprises:
 (a) applying the composition of claim 1 to a stone surface whereby a portion of the surface is coated therewith and a second portion is exposed;
 (b) subjecting the surface to abrasive erosion whereby the exposed surface is eroded;
 (c) and thereafter stripping the composition from the portions of the stone surface coated therewith.

7. A coated article wherein the coating is a composition according to claim 1.

References Cited

UNITED STATES PATENTS

| | | | |
|---|---|---|---|
| 2,770,608 | 11/1956 | Barker et al. | 260—32.6 |
| 2,770,609 | 11/1956 | Symonds | 260—32.6 |
| 2,938,879 | 5/1960 | Mock et al. | 260—23 |
| 3,104,232 | 9/1963 | Clark et al. | 260—32.6 |
| 3,227,589 | 1/1966 | Deutsch | 156—13 |
| 3,239,478 | 3/1966 | Harlan | 260—879 X |
| 3,251,905 | 5/1966 | Zelinski | 260—879 |
| 3,330,796 | 7/1967 | Mock et al. | 260—32.6 |

JOHN T. GOOLKASIAN, Primary Examiner

J. C. GIL, Assistant Examiner

U.S. Cl. X.R.

117—5.5, 132, 133, 134; 161—146, 208, 217; 260—23, 32.6, 880